United States Patent [19]

Hagen

[11] 4,377,953

[45] Mar. 29, 1983

[54] INDEXING APPARATUS

[75] Inventor: James F. Hagen, Troy, Mich.

[73] Assignee: Expert Automation, Inc., Sterling Heights, Mich.

[21] Appl. No.: 186,149

[22] Filed: Sep. 10, 1980

[51] Int. Cl.³ .............................................. B23Q 17/00
[52] U.S. Cl. ....................................... 74/821; 74/96; 74/436; 74/567; 74/820
[58] Field of Search ............... 74/820, 821, 436, 96, 74/567, 89

[56] References Cited

U.S. PATENT DOCUMENTS

| | | | |
|---|---|---|---|
| 562,086 | 6/1896 | Livingstone | 74/50 |
| 1,609,292 | 12/1926 | Burch | 74/96 X |
| 1,980,527 | 11/1934 | Hewton | 74/567 X |
| 1,993,135 | 3/1935 | Friedland | 74/50 |
| 2,513,514 | 7/1950 | Poage | 74/50 |
| 2,918,828 | 12/1959 | Dexter | 74/820 X |
| 3,583,258 | 6/1971 | Fouse | 74/820 |
| 3,680,399 | 8/1972 | Brems | 74/89 |
| 3,757,963 | 9/1973 | Binkley | 214/1 BH |
| 3,818,806 | 6/1974 | Fumagalli | 92/13.2 |
| 3,821,903 | 7/1974 | Eminger | 74/50 |
| 3,869,925 | 3/1975 | Brems | 74/25 |
| 4,202,221 | 5/1980 | Thompson | 74/821 |

Primary Examiner—Rodney H. Bonck
Attorney, Agent, or Firm—Harness, Dickey & Pierce

[57] ABSTRACT

An indexing apparatus (10) is disclosed which is designed for use with various types of work transfer equipment and is operative to provide smooth rapid jerk-free acceleration and deceleration whereby workpieces may be smoothly and rapidly transferred between operating stations. The indexing apparatus (10) includes suitably arranged cams (90, 90′, 106, 124, 130, 132, 150, 162, 180) and cam followers (38, 52, 114, 116, 166, 168, 174) which operate to convert a driving input motion which is typically rotary in nature to a desired output motion which may be either linear or rotary but which is characterized by substantially jerk-free, smooth acceleration and deceleration at the beginning and end of the respective indexing movements. In one embodiment the apparatus comprises a crank arm (22) having cam followers (38, 52) provided thereon which control pivotal movement of transfer arm (58) which is in turn connected to a linearly reciprocable apparatus which may include a work supporting surface for example. In another embodiment cam followers (114, 116) provided on a rotating crank (112) arm are directly engageable with camming surfaces (124, 130, 132) provided on a reciprocable work supporting surface. In yet another embodiment, the cam surfaces (150, 162, 180) are secured on the under surface (144) of a rotatable indexing table (140) and the apparatus is adapted to sequentially index a workpiece supported thereon through a plurality of work stations.

37 Claims, 10 Drawing Figures

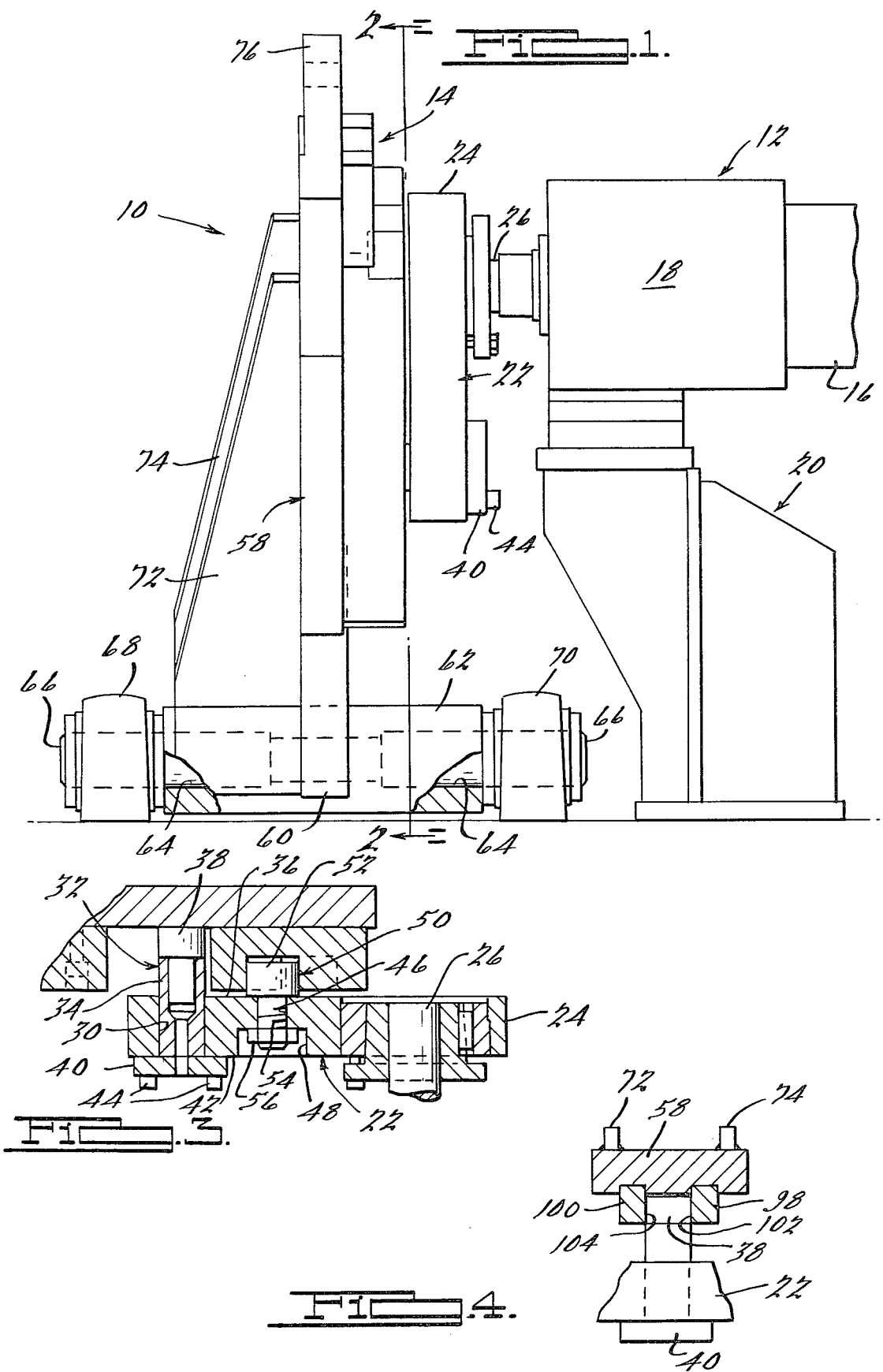

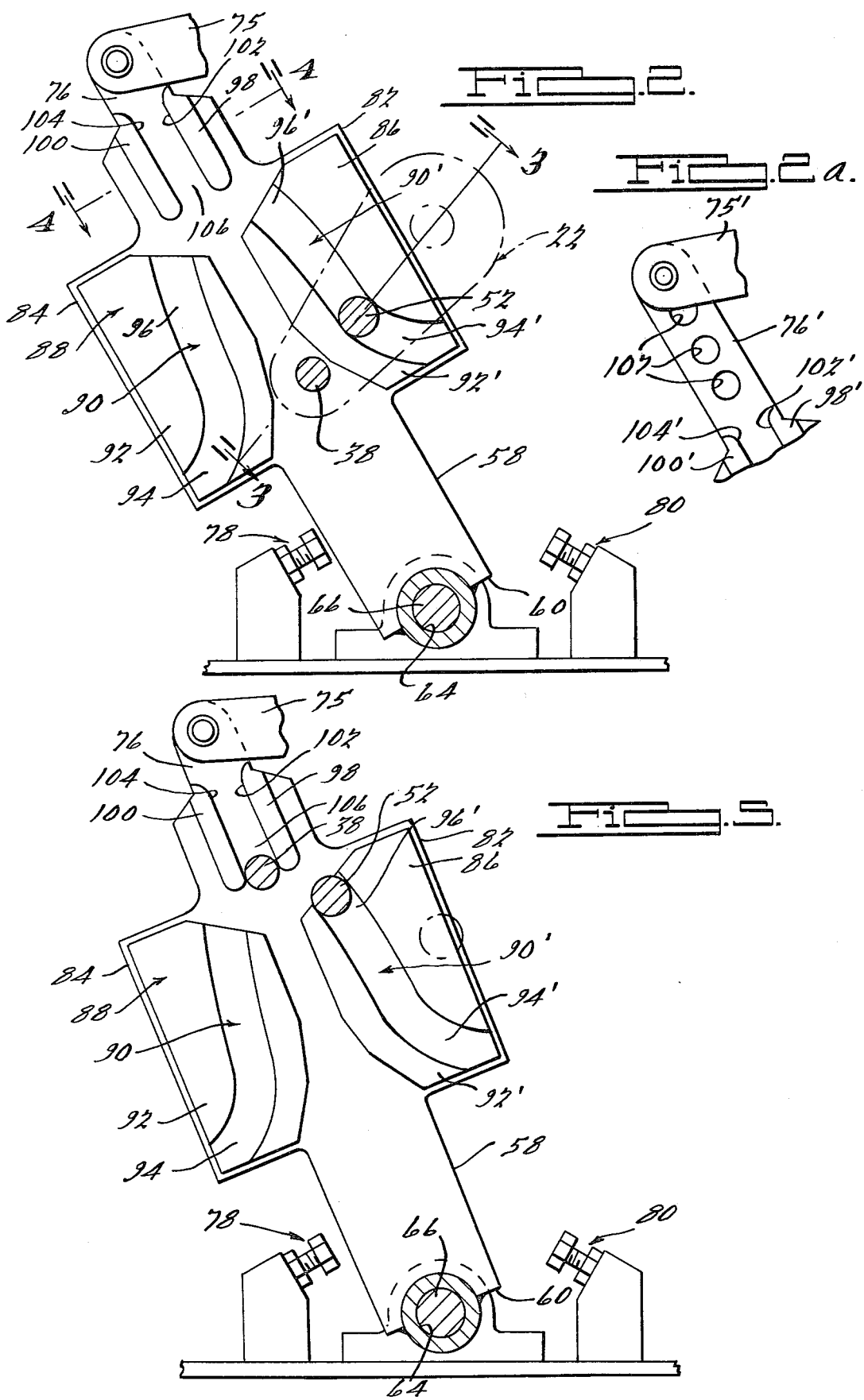

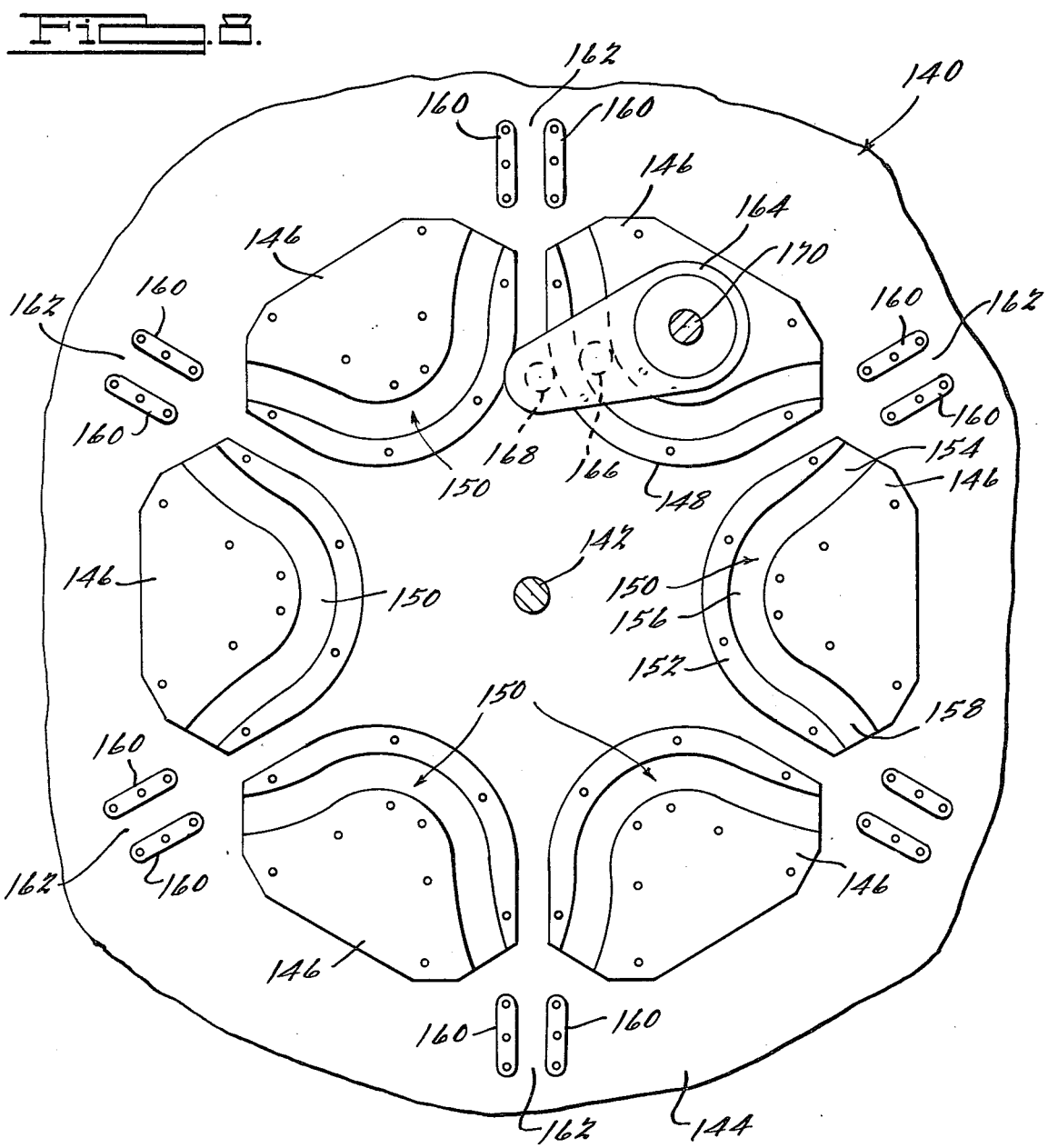
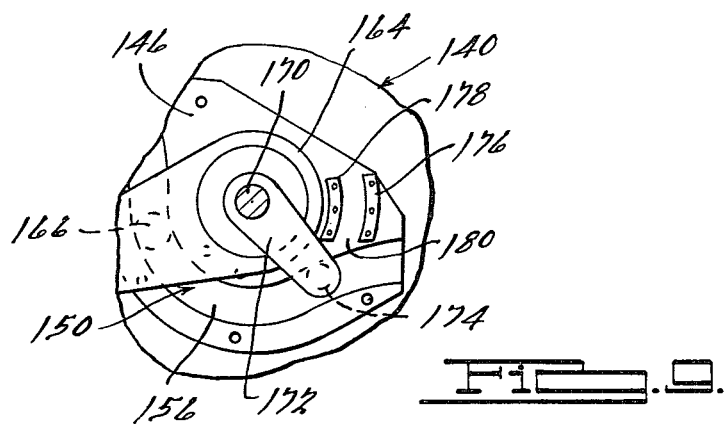

4,377,953

INDEXING APPARATUS

BACKGROUND AND SUMMARY OF THE INVENTION

The present invention relates generally to indexing apparatus and more particularly to drive systems for use in conjunction with such indexing apparatus so as to provide extremely smooth jerk-free acceleration and deceleration of the driven apparatus.

Indexing apparatus of various types have long been in use in conjunction with various types of manufacturing and assembly operations in order to advance workpieces between work stations as well as into and out of various types of machinery. Numerous types of drive systems have been developed over the years in order to accomplish this work transfer operation in a rapid and efficient manner. Typically, such drive systems have employed different combinations of barrel cams, bell cranks, lever arms, or scotch yoke connections and the like. Typically such drive systems must be able to provide periods of dwell at both beginning and ends of the operational cycle with intermediate periods of acceleration/deceleration and possibly a period of constant velocity.

It is highly desirable to provide drive systems for such indexing apparatus which are able to smoothly reciprocate the workpieces into and out of the work stations without subjecting either the workpiece or the associated apparatus to shocks or jerk resulting from sudden acceleration or deceleration from or to a stationary position. This is particularly important with regard to such indexing apparatus which is designed for use in assembly operations wherein the jerk may dislodge parts being assembled although it is desirable to avoid such jerk in all applications because of the adverse effect resulting from subjecting the entire drive train to the stress and strain associated therewith.

It should be noted that as used herein the term "jerk" is defined as the third derivative of displacement with respect to time or the second derivative of velocity with respect to time or the first derivative of acceleration with respect to time.

In addition to reducing or eliminating jerk in such indexing apparatus both at the beginning and end of operational cycles it is also desirable to design such apparatus to be able to reciprocate the workpiece into and out of the work station as rapidly as possible because this transfer represents lost production time. Also, in order to avoid excessive downtime as well as high maintenance costs, it is highly desirable to design such apparatus as simply as possible with a minimum number of moving parts. Coupled with the desire to maintain the design as simple as possible while still accommodating the other operational aspects required is the desirability to enable the apparatus to be easily fabricated at relatively low cost without sacrificing reliability. While previous indexing drive arrangements have been able to achieve differing measures of success in meeting the above conflicting objectives, none of them have been totally effective in providing a completely acceptable indexing drive assembly.

The present invention, however, provides a substantially improved drive system which utilizes a cam and cam follower arrangement specifically designed to provide extremely smooth transition between dwell and acceleration periods which are substantially jerk free. The cam surfaces are designed so as to be easily machined in flat stock thereby substantially reducing the manufacturing costs of the drive system from those employing barrel cams which require extremely costly specialized machining techniques to machine a cam groove along the cylindrical periphery thereof. Additionally, the arrangement of the system is such that the cam surfaces and cam follower operate to insure continuous precise control of the apparatus throughout the full operational cycle of the indexing apparatus. Additionally, because the cam and cam followers are arranged so as to provide extremely smooth jerk free work transfer, the apparatus is not subject to the repetitive stresses and strains associated with jerk movement and therefore offers the advantage of substantially reduce downtime due to equipment failure. The cam grooves are designed so that while jerk is substantially reduced or totally eliminated, the transfer operation is still accomplished within a minimum amount of time because of the ability to provide rapidly increasing rate of acceleration.

Additional advantages and features of the present invention will become apparent from the subsequent description and the appended claims taken in conjunction with the accompanying drawings.

BRIEF DESCRIPTION OF THE DRAWINGS

FIG. 1 is a side elevational view of the indexing apparatus of the present invention;

FIG. 2 is another side elevational view of the indexing apparatus of the present invention with portions thereof shown in section, the section being taken along line 2—2 of FIG. 1;

FIG. 2a is a fragmentary view of the upper end of the transfer arm showing another embodiment thereof all in accordance with the present invention;

FIG. 3 is a sectioned view of the driving crank arm and associated cam followers, the section being taken along line 3—3 of FIG. 2;

FIG. 4 is a section view of the transfer arm of the indexing apparatus, the section being taken along line 4—4 of FIG. 2;

FIG. 5 is a view similar to that of FIG. 2 but showing the crank arm in a different position relative to the transfer arm;

FIG. 8 is a bottom view of another embodiment of the present invention adapted for use in driving a multi-station rotary indexing table; and FIG. 9 is a fragmentary view of a portion of the embodiment shown in FIG. 8 having an auxiliary cam follower and cam means incorporated therein.

DESCRIPTION OF THE PREFERRED EMBODIMENTS

Figure 6:
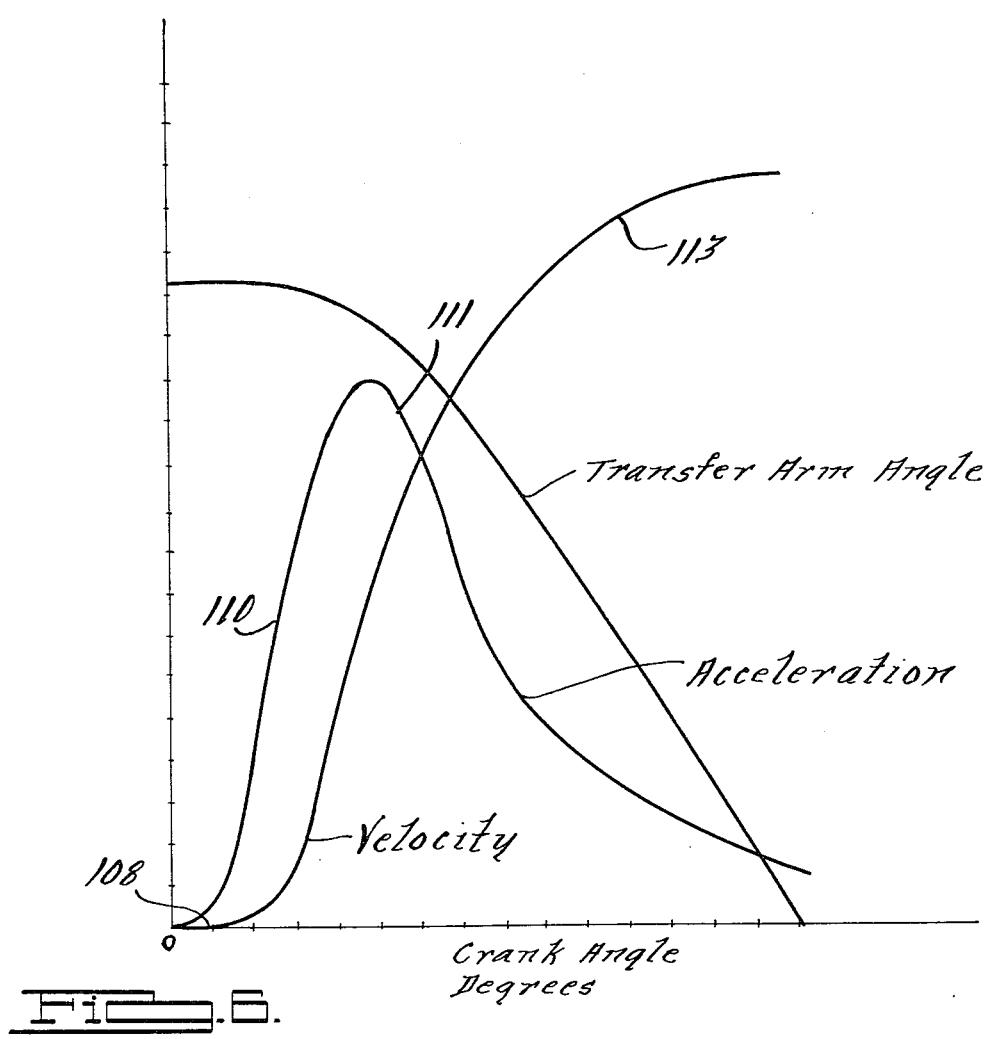
FIG. 6 is a graphical representation of the displacement, velocity, and acceleration curves for the transfer arm.

Referring now to the drawings and in particular to FIGS. 1 through 5, there is shown an indexing apparatus in accordance with the present invention indicated generally at 10 therein. Indexing apparatus 10 comprises a drive assembly 12 and a transfer arm assembly 14 which is adapted to be driven thereby.

Drive assembly 12 preferably comprises a suitably sized reversible electric motor 16 which is connected to a gear reduction assembly 18 all of which are supportingly secured to a pedestal 20 positioned closely adjacent the transfer arm assembly 14 although other types of drives may also be utilized such as hydraulic or pneumatic for example. A crank arm 22 is provided having one end 24 secured to and adapted to be rotatably driven by the output shaft 26 of the gear reduction assembly. The other end of crank arm 22 is provided with an opening 30 extending therethrough within which a cam follower assembly 32 is secured.

Cam follower assembly 32 comprises an elongated generally cylindrical support member 34 extending through opening 30 and generally perpendicularly outwardly from surface 36 of crank arm 22. A cam follower member 38 is rotatably secured to and supported by the outer end of cylindrical member 34. An attachment plate 40 is also secured to the opposite end of cylindrical member 32 and is of a size greater than that of opening 30. A plurality of openings are provided extending through attachment plate 40 which are adapted to accommodate a plurality of suitable fasteners 44 for securing cam follower assembly 32 to crank arm 22.

Crank arm 22 also has a second opening 46 extending therethrough spaced radially inwardly (with respect to the axis of rotation of crank arm 22) from opening 30 and which includes an enlarged diameter portion 48 opening outwardly on one side 42 of crank arm 22. A second cam follower assembly 50 is also provided which includes a cam follower member 52 rotatably supported on a partially threaded shaft 54 extending partially through opening 46 into enlarged diameter portion 48 thereof. A nut 56 is provided threadedly engaging shaft 54 so as to secure cam follower assembly 50 to crank arm 22.

As best seen in FIG. 3, cam follower assemblies 32 and 50 are positioned on crank arm 22 in substantially axially parallel radially spaced relationship with cam follower assembly 32 projecting outwardly a distance substantially greater than that of cam follower assembly 50 so as to thereby enable cam surfaces engageable by the respective cam follower assemblies to be positioned in substantially parallel spaced planar relationship as described in greater detail below.

As best seen with reference to FIGS. 1, 2, and 5, transfer arm assembly 14 comprises an elongated upstanding transfer arm 58, the lower end 60 of which is secured to an elongated generally cylindrical member 62. Cylindrical member 62 has a pair of bores 64 provided therein extending axially inwardly from opposite ends thereof. Shafts 66 are fitted within each of the bores 64 and extend axially outwardly therefrom and through respective pillow block bearing assemblies 68 and 70 positioned in spaced axially aligned relationship and which cooperate to pivotably support transfer arm 58. In order to further support transfer arm 58 on cylindrical member 62 a pair of reinforcing flange members 72 and 74 are secured thereto.

Indexing apparatus 10 will typically be located below a reciprocable work supporting assembly such as for example a reciprocable table assembly and suitable linkage means 75 will be provided extending between the upper end 76 of transfer arm 58 and the reciprocable table assembly or the like whereby pivotable movement of the transfer arm will effect a reciprocating linear movement of the reciprocable table assembly. In the embodiment of the present invention illustrated transfer arm 58 is designed to be movable through a total arc of approximately 60° or approximately 30° either side of a true vertical position. If desired, suitable stop members 78 and 80 may be positioned adjacent opposite sides of transfer arm 58 so as to prevent excessive travel thereof.

Between ends 60 and 76, transfer arm 58 has a pair of opposite laterally outwardly extending flange portions 82 and 84 arranged generally symmetrically of the longitudinal axis thereof. A pair of plates 86 and 88 of irregular shape generally as shown are secured in space relationship to respective flange portions 82 and 84. Plates 86 and 88 are substantially mirror images of each other and therefore only plate 88 will be described in detail with corresponding portions of plate 86 being indicated by like numbers primed.

Plate 88 has a generally arcuately extending camming surface groove 90 machined in outer surface 92 thereof which is adapted to receive and cooperate with cam follower member 52 to effect movement of transfer arm 58 in response to rotational movement of crank arm 22. Proceeding from the lower end thereof, camming surface groove 90 includes a first portion 94 having a substantially constant radius of curvature, the radius of curvature being substantially equal to the distance between the axis of rotation of crank arm 22 and cam follower member 52 so as to enable portion 94 to provide a dwell period during which rotational movement of crank arm 22 will not produce any corresponding movement of transfer arm 58. The dwell portion is followed by a second portion 96 having a progressively increasing radius of curvature which operates to provide a period of smooth but rapidly increasing accelerating movement of transfer arm 58 in response to rotation of crank arm 22. As shown, acceleration portion 96 is designed to merge smoothly with and form a continuation of dwell portion 94 whereby the transfer arm and associated workpiece may be accelerated smoothly so as to enable the workpiece to be transferred without being subjected to jerk all in response to substantially constant velocity rotation of crank arm 22.

Positioned adjacent upper end 76 of transfer arm 58 and spaced a substantially equal distance on either side of the longitudinal axis of transfer arm 58 are a pair of elongated members 98 and 100, the inner sidewalls 102 and 104 of which define a substantially straight camming surface groove 106 therebetween which is adapted to receive and cooperate with cam follower member 38 to continue driving transfer arm 58 for a substantial portion of the transfer cycle and while cam follower 52 moves out of camming surface groove 90' and into camming surface groove 90 in response to rotational movement of crank arm 22.

It should be noted that as shown in FIG. 1, the axially outer surfaces of elongated members 98 and 100 are positioned so as to enable cam follower member 52 to move thereacross without engaging same.

The operation of the indexing apparatus of the present invention may best be explained with reference to the graph illustrated in FIG. 6 which plots velocity, acceleration and displacement of the transfer arm as a function of the crank arm angle. It should be noted that the graphical illustration of FIG. 6 is representative of the first half of an operation cycle it being understood that the second half will be substantially a mirror image of the first half. The zero reference point of the crank arm angle of the graph corresponds to approximately the position shown in FIG. 2 in which cam follower member 52 is in engagement with the dwell portion 94' of the cam surface 90' and cam follower member 38 is unrestrained. In the embodiment of the present invention shown in FIG. 2, crank arm 22 is in a position approximately 50° below a horizontal position which position also corresponds approximately to the transition point between the dwell and acceleration/deceleration portion of cam surface 90'. When crank arm 22 is in this position transfer arm 54 is fully displaced to the left as seen in FIG. 2. As the crank arm 22 begins to rotate, cam follower member 52 will move upwardly along the cam surface provided by groove 90' into the acceleration/deceleration portion 96' of the groove camming surface. Initial movement of cam follower member 52 into acceleration/deceleration portion 96' will result in very gradual acceleration as represented by the portion 108 of the acceleration curve on the graph of FIG. 6. However, because the radius of curvature of the acceleration/deceleration portion 96' of the camming surface groove 90' is increasing at an ever-increasing rate, the actual acceleration imparted to transfer arm 58 by the interengagement between cam follower member 52 and the camming surface groove 90' will produce a rapidly increasing acceleration as represented by portion 110 of the acceleration curve shown on the graph of FIG. 6. As cam follower member 52 moves toward and into the position shown in FIG. 5 of the drawings, the rate of acceleration will begin to decrease as indicated by reference number 111 and will continue to do so as cam follower member 38 moves into engagement with camming surface groove 106.

The corresponding velocity curve 113 also plotted on the graph of FIG. 6 shows that initial movement of transfer arm 58 is accomplished very smoothly and thereafter increases at a very rapid rate generally following the acceleration curve. As the rate of acceleration begins to decrease the velocity curve shows a gradually leveling off until such time as substantially maximum velocity is reached which will correspond to a position in which transfer arm 58 is in a substantially vertical position and the longitudinal axis thereof is in substantial alignment with the longitudinal axis of crank arm 22.

Relating the acceleration and velocity curves to actual movement of both crank arm 22 and transfer arm 58, it is seen that while cam follower member 52 is in dwell portion 94' of camming surface groove 90', rotational movement of crank arm 22 will not produce any movement of transfer arm 58. This dwell period is desirable in order to enable the drive motor to start and come up to substantially full speed while in a substantially unloaded condition. Additionally, at the end of the operational cycle, the dwell period provides a relatively significant period for the motor to be de-energized and braked or if desired allowed to coast to a stop.

As the crank arm is rotationally driven so as to move cam follower member 52 out of dwell portion 94' and into the acceleration/deceleration portion 96' of camming surface groove 90' initially relatively large incremental movement of crank arm 22 will result in a very small incremental movement of transfer arm 58. However, upon continued rotation of crank arm 22, each incremental movement thereof will result in an increasingly greater incremental displacement of the transfer arm 58. Because the movement of transfer arm 58 will be directly transmitted to the workpiece supporting assembly via linkage 75, the supporting assembly will experience substantially the same smooth but rapid jerk-free acceleration thereby enabling a workpiece supported thereon to be transferred into and out of a work station very smoothly and without being subjected to any jarring jolts or the like which could result in shifting thereof on the work supporting surface or loss of parts therefrom should the operation to be performed be part of an assembly operation.

As shown in FIG. 5, camming surface grooves 106, 90 and 90' are so arranged that at the point just prior to exiting of cam follower member 52 from groove 90', cam follower member 38 will already have moved into full engagement with groove 106. Thus, a smooth transition is achieved between cam follower members 38 and 52 and full control of the transfer arm is maintained. It should also be noted that in order to insure crank arm 22 maintains control of transfer arm 58 throughout the operational cycle, camming surface grooves 90, 90' and 106 are so arranged as to insure that any pivotal movement of the transfer arm is opposed by engagement of one or both of cam follower members 38 and 52 with the respective sidewall surfaces which in part define camming surface grooves 90, 90', and 106. That is to say that at no point will cam follower members 38 or 52 be traversing a portion of the camming surface grooves when the sidewalls thereof are in a position so as to extend generally tangentially of an arc scribed by the movement of transfer arm 58. The only exception to this lies at the trailing or lower end of the dwell portion 94 and 94' of the camming surface grooves 90 and 90' which are provided primarily to accommodate overrunning of the motor at the completion of the work transfer cycle should timely de-energization of the motor not occur. In order to prevent loss of control of the transfer arm at these extremes a pair of stops 78 and 80 may be provided positioned so as to engage transfer arm 58 at or slightly beyond its maximum angular displacement as shown in FIGS. 2 and 5.

Thus, as is apparent from the above, the present invention provides an extremely uncomplicated indexing apparatus capable of providing reciprocable work transfer movement such as for indexing workpieces into and out of operation performing means which indexing apparatus is rugged and durable yet may be easily fabricated at relatively low cost. While, as described above, the drive assembly and associated transfer arm is described as being positioned below the apparatus to be driven thereby, it may be located in substantially any convenient relationship relative thereto. Additionally, it should be noted that the stroke or length of the reciprocable movement may be easily varied by merely selecting either longer or shorter transfer arms or alternatively increasing the length of the arc through which the transfer arm is moved. Further, as shown in FIG. 2(a), it is also possible to provide a variable stroke by extending the length of end portion 76' of transfer arm 58' and providing a plurality of spaced openings 107 therealong thereby enabling linkage means 75' to be connected to any one of these openings. Alternatively an elongated slot could be substituted for openings 107.

Figure 7:
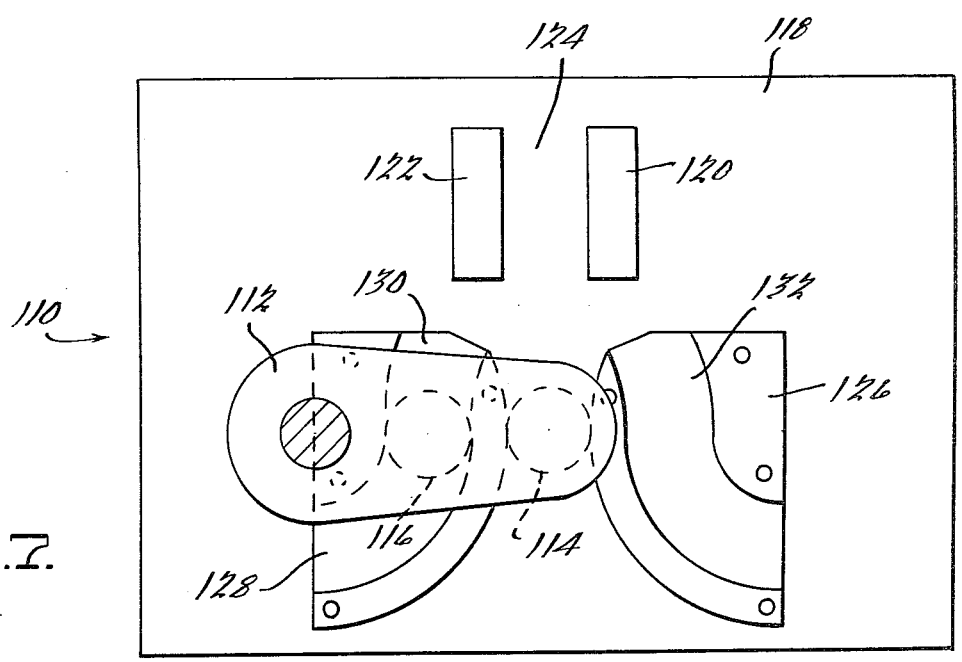
FIG. 7 is a side elevational view of another embodiment of the present invention in which rotary motion is directly translated into linearly reciprocable motion, the view being similar to that of FIG. 2 with portions thereof shown in section.

In some applications it may not be convenient to accommodate the pivot arrangement required for the transfer arm assembly 14 of the previous embodiment due to space limitations or the like. However, the present invention may be easily adapted for use without employing a pivoting transfer arm assembly while still providing the advantages of substantially improved smooth jerk-free transfer of the workpieces. Such an embodiment is illustrated generally at 110 in FIG. 7. In this embodiment, a crank arm 112 is provided which is substantially identical to crank arm 22 described above, and includes a pair of cam follower members 114 and 116 secured therein in generally radially spaced axially extending relationship. A linearly movable member 118 is also provided which is preferably attached to or forms a part of a work supporting carriage assembly (not shown) which will be adapted to be reciprocated along suitable designed supporting guide means. For example, the guide means may be in the form of rails with the carriage assembly having suitable wheels or rollers provided thereon or suitable linear motion ball bushings may be utilized in conjunction with suitable rods or bars.

In any event, a first pair of generally rectangularly shaped elongated members 120 and 122 are secured to plate member 118 in substantially parallel spaced relationship so as to define a relatively straight camming surface groove 124 therebetween which is of a size adapted to receive and guide cam follower member 114. Another pair of irregular shaped members 126 and 128 are also secured to the plate member 118 in a position spaced below and outwardly in opposite directions from the longitudinal centerline of camming surface groove 124. Each of these members also has a camming surface groove 130, 132 provided therein of a contour substantially identical to the contour of the previously described camming surface grooves 90 and 90', respectively.

In operation, rotational movement of crank arm 112 will result in linear translation of plate member 118 producing substantially the same characteristic velocity, acceleration, and displacement curves as shown in the graph of FIG. 6. It should be noted that plate member 118 may form the bottom surface of the work supporting apparatus in which case crank arm 112 would be oriented to rotate generally in a plane lying parallel to the direction of movement or alternatively in the form of an outwardly extending flange portion secured to the work supporting apparatus in which case crank arm 112 would be positioned to rotate in a plane lying generally perpendicular to the work supporting surface of the carriage assembly. Additionally, because the cam arrangement is such as to maintain positive engagement between the cam follower members 114 and 116 and cam surfaces 124, 120 and 132 throughout the normal operational cycle, the apparatus may be oriented for substantially any plane of operation desired. Also as in the previously described embodiment, the dwell periods provided in the cams allow for a reasonable amount of overrunning of the drive assembly. However, as they both open outwardly at the ends thereof, it is possible for the drive assembly to overtravel well in excess of 180° without resulting in damage to the equipment such as may occur in the event of control failure. In this embodiment, the crank arm will be designed to rotate through an arc of approximately 180° or slightly greater with the length of travel being approximately equal to twice the distance between the axis of rotation of crank arm 112 and cam follower member 114.

The present invention is also very well suited for use in rotary indexing apparatus of the type which comprise a work supporting table assembly which is adapted to rotate workpieces through a plurality of circumferentially spaced work stations. Such an embodiment of the present invention is illustrated at 134 in FIG. 8.

In this embodiment, a rotary indexing table 140 is provided which may be supported for rotation about a central axis such as upon a vertical extending shaft 142 as shown or alternatively on a circumferentially extending perimeter track or bearing arrangement. It should also be noted that the table may alternatively be oriented for rotation about a horizontal axis or an inclined axis as well. In any event, the bottom or under surface 144 of table 140 has a plurality of plate members 146 secured thereto in a generally circularly spaced arrangement. As each of these plates are substantially identical only one will be described in detail, it being understood that corresponding portions of other plates are indicated by like numbers.

Plate 146 has a generally irregular shape substantially as shown including a generally arcuate shape radially inner edge 148 and includes an elongated camming surface groove 150 machined in outwardly facing surface 152 thereof. As shown, groove 150 corresponds substantially to a back to back arrangement of camming surface grooves 90 and 90' including a first acceleration/deceleration portion 154, a dwell portion 156 and a second acceleration/deceleration portion 158. Similarly to that previously described, acceleration/deceleration portions 154 and 158 each have a radius of curvature which increases at an increasing rate as the groove extends outwardly from either end of dwell portion 156 and dwell portion 156 has a substantially constant radius of curvature.

A plurality of generally rectangularly shaped elongated members 160 are also secured to surface 144 of table 140 being arranged in generally radially extending spaced substantially parallel pairs. Each pair of elongated members 160 defines a generally radially extending substantially straight camming surface groove 162 therebetween. As shown, the longitudinal axis of each of grooves 162 lies along a radius of table 140 and is positioned generally centrally between spaced plates 146.

A generally horizontally disposed crank arm 164 is also provided which is substantially identical to the crank arms 22 and 112 previously described and which includes a pair of cam follower members 166 and 168 secured thereto in radially spaced relationship. A gear motor drive (not shown) substantially the same as described with reference to FIGS. 1 through 5 is also provided with which includes a generally vertically extending shaft 170 to which crank arm 164 is secured and which is designed to rotatably drive same.

In operation, crank arm 164 will be rotatably driven through a full 360° of rotation in order to advance indexing table from one station to the next, it being understood that the plates 146 will be positioned relative to the workpiece supporting locations provided on the other side of table 140 such that they will be aligned with a work station when cam follower member 166 is positioned within the dwell portion 156 of groove 150.

Thus, as crank arm 164 is rotated to initiate an indexing operation, cam follower member 166 will move out of dwell portion 156 and into one of the acceleration/deceleration portions 154 or 158 depending upon the direction of rotation thereof thereby initiating rotational movement of table 140. As crank arm continues to rotate cam follower member 168 will move radially outwardly with respect to table 140 and enter groove 162 as cam follower member 166 exits from the acceleration/deceleration portion 154 or 158, it being understood that members 160 and plates 146 are so positioned relative to each other and to the position of respective cam follower members 166 and 168 that at one position both cam follower members 166 and 168 will engage respective groove portions 154 or 158 and 162 so as to assure continuous positive control of the indexing table and to prevent subjecting the driving or driven apparatus to any shock loading or jerk such as may result were both cam follower members to be simultaneously out of driving engagement therewith.

As crank arm continues to rotate, cam follower member 168 in cooperation with groove 162 will continue to rotate table 140 until such time as cam follower member 166 moves into the acceleration/deceleration portion 158 or 154 of the next adjacent groove 150 provided in an adjacent plate 146. As cam follower 166 moves through groove 150 toward dwell portion 156, table 140 will be subjected to decelerating movement and brought smoothly to a stationary position again without subjecting the workpieces or associated drive apparatus to substantially any shock loading or jerk. Once cam follower 166 has moved into dwell portion 156 of groove 150, the gear motor drive may be de-energized and allowed to coast to a stop or braked if desired while the respective work stations perform their respective operations on the workpieces supported on table 140.

It should be noted that while the embodiment illustrated in FIG. 8 shows cam means operative to accommodate a plurality of six stations around the periphery of table 140, the actual number thereof may be increased or decreased by merely adding or deleting the number of cam means provided. It should also be noted that in order to prevent the potential for temporary loss of positive control of the movement of table 140 by crank arm 164 such as may occur as cam follower member 166 moves through the midpoint of dwell portion 156 of groove 150, it may be desirable to provide another crank arm 172 secured to shaft 170 but located at a suitable angle relative to crank arm 164 and including a cam follower member 174 secured to the outer end thereof. A pair of generally elongated curved members 176 and 178 may be secured to the outer surface of plate 146 in generally spaced relationship so as to define a groove 180 of substantially constant width therebetween. Preferably the length of groove 180 will be substantially less than the length of dwell portion 156 and will be positioned with respect to the relative angulation between crank arms 164 and 172 such that cam follower member 174 will be approximately at the midpoint thereof when cam follower 166 is at the midpoint of dwell portion 156. Thus, the engagement of cam follower member 174 with respective of members 176 and 178 defining groove 180 therebetween will operate to prevent any free movement of table 140 thereby assuring that positive control of table 140 is maintained throughout the indexing cycle.

Thus, as is apparent from the above, the indexing apparatus of the present invention is extremely well suited for use in conjunction with a variety of different work transfer apparatus so as to enable such apparatus to transfer workpieces into and out of operation performing work stations while substantially reducing or eliminating the jerk to which such workpieces and associated transfer mechanisms have traditionally been subjected to. It should also be noted that while the present invention has been described with reference to application with work transfer apparatus, it is also well suited for use in other applications requiring cyclical transfer of apparatus. Additionally, the apparatus of the present invention provides a relatively simple drive arrangement which not only offers a high reliability thereby reducing the possibility of expensive downtime or the need for costly maintenance but also is relatively inexpensive to manufacture thereby enabling it to be adopted for use in such apparatus wherein drive arrangements offering such functions were heretofore not cost justified.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

I claim:

1. In a modified harmonic motion indexing apparatus having drive means including a rotatable output shaft operatively connected to transfer apparatus between first and second positions, an improved drive system comprising:

a crank arm secured to said output shaft and adapted to be rotatably driven thereby;

cam follower means secured to said crank arm;

transfer means movable from a first position to a second position, said transfer means including a camming plate having a camming surface groove provided thereon adapted to receive said cam follower means and to cooperate therewith to move said transfer means from said first position to said second position, said camming surface groove including a dwell portion at one end thereof and an acceleration portion, said acceleration portion having a contour such that movement of said cam follower from said dwell portion into said acceleration portion in response to rotation of said crank arm will operate to smoothly accelerate said transfer means from a stationary position whereby jerk is substantially eliminated; and a second camming surface groove adapted to receive said cam follower means and to cooperate therewith to decelerate said transfer means as said transfer means is moved into said second position, said second camming surface groove including a deceleration portion and a dwell portion, said deceleration portion having a contour merging with said dwell portion such that as said cam follower means moves from said deceleration portion into said dwell portion the first and second derivatives of the velocity of said transfer means with respect to time are substantially equal to zero when said velocity is equal to zero whereby jerk is substantially eliminated.

2. An indexing apparatus as set forth in claim 1 wherein said second camming surface groove is provided in a second camming plate secured to said transfer means adjacent said first plate.

3. An indexing apparatus as set forth in claim 1 wherein said camming surface groove is defined by outwardly extending sidewalls and is positioned relative to said cam follower means such that movement of said transfer means relative to said cam follower means is restrained by engagement of said cam follower means with one of said sidewalls substantially continuously while said transfer means is moved from said first position to said second position whereby said crank arm is operative to maintain positive control of said transfer means continuously as it is moved from said first position to said second position.

4. An indexing apparatus as set forth in claim 3 wherein said transfer means comprises an elongated transfer arm having one end pivotably supported on said indexing apparatus and said camming plate and said second camming plate are secured to said transfer arm in spaced relationship.

5. An indexing apparatus as set forth in claim 4 further comprising a generally radially outwardly extending camming surface groove defined by a pair of spaced elongated members secured to said transfer arm, said elongated members being spaced between and radially outwardly of said camming plates and a second cam follower provided on said crank arm spaced radially outwardly from said cam follower, said second cam follower means being received within said radially outwardly extending camming surface groove so as to control movement of said transfer arm while said cam follower means moves from said camming surface groove to said second camming surface groove.

6. An indexing apparatus as set forth in claim 5 wherein said radially extending camming surface groove is positioned so as to receive said second cam follower means before said cam follower moves out of said camming surface groove whereby said crank arm is able to maintain positive control of said transfer arm.

7. An indexing apparatus as set forth in claim 4 wherein said dwell portion opens outwardly from said camming plate whereby said cam follower means may move out of said camming surface groove in the event said output shaft continues to rotate beyond a predetermined distance.

8. An indexing apparatus as set forth in claim 4 wherein said crank arm is adapted to be reversibly rotated through less than a full 360° in order to move said transfer arm from said first position to said second position.

9. An indexing apparatus as set forth in claim 8 wherein said drive means comprises a reversible gear motor.

10. An indexing apparatus as set forth in claim 3 wherein said transfer means comprises a linearly reciprocable member and said camming plate and said second camming plate are secured to a flange portion thereof.

11. An indexing apparatus as set forth in claim 10 wherein said crank arm is adapted to be reciprocably driven through an arc of approximately 180° of rotation.

12. An indexing apparatus as set forth in claim 1 wherein said transfer means comprises a rotary indexing table.

13. An indexing apparatus as set forth in claim 12 wherein said rotary indexing table has a plurality of said camming plates secured thereto, said camming plates being disposed in circumferentially spaced relationship.

14. An indexing apparatus as set forth in claim 13 wherein said acceleration portion of said camming surface groove merges smoothly with one end of said dwell portion and said deceleration portion of said camming surface groove merges smoothly with the other end of said dwell portion.

15. An indexing apparatus as set forth in claim 14 wherein the number of said camming plates corresponds to the number of stations provided around the periphery of said table.

16. An indexing apparatus as set forth in claim 14 wherein said camming plates are positioned on said table so as to position a workpiece within a work station when said cam follower means is positioned within said dwell portion.

17. An indexing apparatus as set forth in claim 16 further comprising another cam follower connected to said crank arm and adapted to rotate therewith and a control camming surface groove provided on said table extending in a generally radial direction relative to the axis of rotation of said table, said another cam follower being received within said control groove when said cam follower means is positioned in said dwell portion whereby positive control of said table is maintained during movement of said cam follower means through said dwell portion.

18. An indexing apparatus as set forth in claim 14 wherein said crank arm is adapted to be rotated through one revolution to advance said table through each station provided around the periphery thereof.

19. An indexing apparatus as set forth in claim 18 further comprising a generally radially outwardly extending camming surface groove defined by a pair of spaced elongated members secured to said table, said elongated members being spaced between and radially outwardly of said camming plates and operative to control movement of said table during a portion of said transfer operation.

20. An indexing apparatus as set forth in claim 19 further comprising a second cam follower provided on said crank arm spaced radially outwardly from said cam follower means, said second cam follower being received within said radially outwardly extending camming surface groove so as to control movement of said table while said cam follower means moves from said acceleration portion of said camming surface groove provided on one of said camming plates to said deceleration portion of said camming surface groove provided on a next adjacent camming plate.

21. An indexing apparatus as set forth in claim 19 wherein said radially extending camming surface groove is positioned so as to receive said second cam follower before said cam follower means moves out of said camming surface groove whereby said crank arm is able to maintain positive control of said table.

22. In an indexing apparatus adapted for use to advance workpieces supported on movable means into and out of operation performing work stations, an improved drive assembly therefor comprising:
   drive means having an output shaft adapted to be rotationally driven;
   a crank arm secured to said output shaft, said output shaft being operative to rotationally drive said crank arm;
   driven means operatively associated with said crank arm and adapted to be driven thereby;
   cam means provided on one of said crank arm and said driven means and cam follower means secured to the other of said crank arm and said driven means, said cam means having a first portion contoured to cooperate with said cam follower means to provide a dwell period and a second portion comprising a groove being generally arcuate in contour and having a radius of curvature which increases at an increasing rate as distance from said first portion increases whereby said groove cooperates with said cam follower means to smoothly accelerate said driven means in response to substantially constant velocity rotation of said crank arm in a manner such that the first derivative of acceleration with respect to time increases gradually so as to avoid subjecting said indexing apparatus to any substantial jerk.

23. An indexing apparatus as set forth in claim 22 wherein said cam means comprises a groove defined by a pair of sidewalls positioned in substantially parallel spaced relationship.

24. An indexing apparatus as set forth in claim 23 wherein said sidewalls forming said second portion of said cam means are positioned at an angle relative to the direction of travel of said driven member so as to maintain substantially continuous positive control of driven means by said crank arm.

25. An indexing apparatus as set forth in claim 22 wherein said cam means comprises first and second plate members each having generally arcuately shaped camming surface grooves machined therein, said plates being adapted to be secured in spaced side by side relationship and a pair of elongated members adapted to be secured in substantially parallel spaced relationship to each other and spaced from said plate members so as to define a relatively straight camming surface groove therebetween.

26. An indexing apparatus as set forth in claim 25 wherein said driven means comprises an elongated transfer arm having one end pivotably secured to said indexing apparatus, said first and second plates being secured to said transfer arm intermediate the ends thereof and spaced substantially an equal distance on opposite sides of the longitudinal axis thereof.

27. An indexing apparatus as set forth in claim 26 wherein said pair of elongated members are secured to said transfer arm adjacent another end thereof with said substantially straight camming surface groove extending substantially coaxially with the longitudinal axis of said transfer arm.

28. An indexing apparatus as set forth in claim 26 wherein said cam means include a second cam follower secured to said crank arm adjacent the radially outer end thereof, said second cam follower being adapted to be received within said relatively straight camming surface groove and to cooperate therewith to drive said transfer arm during a portion of the movement of said transfer arm.

29. An indexing apparatus as set forth in claim 28 wherein said crank arm is adapted to be reversibly rotated through less than a full 360° in order to move said transfer arm from said first position to said second position.

30. An indexing apparatus as set forth in claim 29 wherein said drive means comprises a reversible gear motor.

31. In an indexing apparatus for use in transferring a workpiece into and out of a work station, an improved drive assembly comprising:
a reversible gear motor drive means having a rotating output shaft;
a crank arm having one end secured to said output shaft and adapted to be driven thereby;
a first cam follower secured adjacent the other end of said crank arm;
a second cam follower secured to said crank arm intermediate the ends thereof;
a transfer arm having one end pivotably secured to said indexing apparatus and being reciprocably movable between first and second positions;
a first pair of cam plates secured to said transfer arm intermediate the ends thereof, each of said cam plates having an arcuately shaped camming surface groove machined therein adapted to receive said second cam follower;
a pair of elongated members secured in spaced relationship adjacent the other end of said transfer arm and defining a substantially straight camming surface groove therebetween adapted to receive said first cam follower;
said second cam follower cooperating with one of said arcuately shaped camming surface grooves to accelerate said transfer arm in response to substantially constant velocity rotation of said output shaft in such a manner that the first derivative of acceleration with respect to time is relatively small during initial movement of said transfer arm whereby the jerk to which said indexing apparatus may be subjected to during acceleration is substantially eliminated,
said first cam follower cooperating with said straight camming surface groove to drive said transfer arm as said second cam follower moves out of said one of said arcuately shaped camming surface groove and into the other thereof.

32. An indexing apparatus as set forth in claim 31 wherein the other of said arcuately shaped camming surface grooves cooperates with said second cam follower to decelerate said transfer arm in such a manner that the deceleration of said transfer arm is substantially equal to zero at substantially the same time the velocity of said transfer arm is equal to zero whereby the jerk to which said transfer arm is subjected to as said transfer arm approaches said second position is substantially eliminated.

33. An indexing apparatus as set forth in claim 31 wherein said arcuately shaped camming surface grooves each include a dwell portion, said crank arm being inoperative to effect movement of said transfer arm when said cam follower is disposed within said dwell portion.

34. An indexing apparatus as set forth in claim 35 wherein each of said arcuately shaped camming surface grooves open outwardly from one end of said dwell portion whereby said crank arm may rotate said second cam follower beyond said dwell portion without damaging said indexing apparatus in the event of overrunning of said drive means.

35. An indexing apparatus as set forth in claim 34 wherein said indexing apparatus further includes stop means positioned adjacent said transfer arm and engageable therewith to limit movement of said transfer arm in the event said second cam follower moves beyond said dwell portion.

36. An indexing apparatus as set forth in claim 31 wherein said arcuately shaped camming surface grooves are positioned relative to said straight camming surface such that said first cam follower is in engagement with said straight camming surface groove while said second cam follower is in engagement with one of said arcuately shaped camming surface grooves whereby said crank arm is operative to maintain positive control of said transfer arm throughout said movement between said first and second positions.

37. An indexing apparatus as set forth in claim 31 wherein said first cam follower extends axially outwardly from said crank arm a predetermined distance greater than said second cam follower and said elongated members extend outwardly from said transfer arm a distance less than said predetermined distance so as to provide a clearance whereby said second cam follower may move across the outer surface of said elongated members without engagement therewith.

* * * * *

UNITED STATES PATENT AND TRADEMARK OFFICE
CERTIFICATE OF CORRECTION

PATENT NO. : 4,377,953
DATED : March 29, 1983
INVENTOR(S) : James F. Hagen

It is certified that error appears in the above-identified patent and that said Letters Patent is hereby corrected as shown below:

Column 4, line 11, "space" should be --spaced--.

Column 14, line 38, (Claim 34), "35" should be --33--.

Signed and Sealed this

Fourteenth Day of June 1983

[SEAL]

Attest:

DONALD J. QUIGG

Attesting Officer — Acting Commissioner of Patents and Trademarks